United States Patent
Shimodaira et al.

(10) Patent No.: US 7,453,610 B2
(45) Date of Patent: Nov. 18, 2008

(54) COLOR DISPLAY SYSTEM AND IMAGE TRANSFORMING DEVICE

(75) Inventors: Yoshifumi Shimodaira, Hamakita (JP); Takamori Shimazu, Hamamatsu (JP)

(73) Assignee: National University Corporation Shizuoka University (JP)

( * ) Notice: Subject to any disclaimer, the term of this patent is extended or adjusted under 35 U.S.C. 154(b) by 123 days.

(21) Appl. No.: 11/472,604

(22) Filed: Jun. 22, 2006

(65) Prior Publication Data
US 2006/0268301 A1 Nov. 30, 2006

Related U.S. Application Data

(63) Continuation-in-part of application No. PCT/JP2004/019312, filed on Dec. 24, 2004.

(30) Foreign Application Priority Data
Dec. 24, 2003 (JP) ............ P2003-427660

(51) Int. Cl.
G03F 3/08 (2006.01)
G06F 15/00 (2006.01)
B41C 1/00 (2006.01)

(52) U.S. Cl. ............ 358/518; 358/1.9; 358/3.32

(58) Field of Classification Search ............ 358/518, 358/1.9–3.32; 345/431
See application file for complete search history.

(56) References Cited

U.S. PATENT DOCUMENTS 6,118,455 A * 9/2000 Hidaka et al. ............ 345/589
6,229,916 B1 * 5/2001 Ohkubo ............ 382/167

FOREIGN PATENT DOCUMENTS

| JP | 9-98444 | 4/1997 |
| JP | 9-200790 | 7/1997 |
| JP | 2003-323610 | 11/2003 |

* cited by examiner

*Primary Examiner*—King Poon
*Assistant Examiner*—Temitayo Folayan
(74) *Attorney, Agent, or Firm*—Ostrolenk, Faber, Gerb & Soffen, LLP

(57) ABSTRACT

A color display system has an image transforming device transforming an image signal $(X_C, Y_C, Z_C)$ of a XYZ colorimetric system to an image signal of a RGB colorimetric system and outputting the image signal of the RGB colorimetric system; and a display receiving the image signal of the RGB colorimetric system which has been output from the image transforming device. The image transforming device has: a converting part; a calculation part; a determination part; and a feedback part.

3 Claims, 4 Drawing Sheets

COLOR DISPLAY SYSTEM AND IMAGE TRANSFORMING DEVICE

CROSS-REFERENCE TO RELATED APPLICATIONS

This is a Continuation-In-Part application of International Patent application serial No. PCT/JP2004/019312 filed on Dec. 24, 2004 now pending.

BACKGROUND OF THE INVENTION

1. Field of the Invention

The present invention relates to a display system of colors in the color gamut of a display, and particularly to a high accuracy display system thereof.

2. Related Background Art

An RGB calorimetric system and an XYZ colorimetric system are well known as color systems. With the RGB colorimetric system, actually existing monochromatic light is used as primary stimuli to define existing colors by combining their primary stimulus values. Although capable of expressing colors in association with physical coloring materials, this colorimetric system has shortcomings such as presence of negative color-matching functions. Negative color-matching functions are inconvenient when designing actual optical equipments in that g=G/(R+G+B) on the chromaticity coordinate is broad but r=R/(R+G+B) is narrow.

Therefore, the XYZ colorimetric system which is free from the shortcomings of the RGB calorimetric system and is convenient for calculating color specification is defined as CIE-1931. Assuming that there is a linear relationship between the RGB calorimetric system and the XYZ colorimetric system, there is a relationship therebetween, which can be expressed by an equation (10) below.

Since it is assumed that a linear relationship exists between the RGB calorimetric system and the XYZ calorimetric system, which is apparent from the equation (10), conversion between RGB and XYZ has been performed linearly in a gradation range of 0 to 255, with the value 255 as the maximum luminance.

$$\begin{bmatrix} X \\ Y \\ Z \end{bmatrix} = \begin{bmatrix} 2.7689 & 1.7518 & 1.1302 \\ 1.0000 & 4.5907 & 0.0601 \\ 0 & 0.0565 & 5.5943 \end{bmatrix} \begin{bmatrix} R \\ G \\ B \end{bmatrix} \quad (10)$$

SUMMARY OF THE INVENTION

The conventional method described above has shortcomings in that, when a chromaticity (ratio of tristimulus value) of each of three primary colors varies due to non-linearity of half-tone reproduction characteristic, temperature variation, aging or the like, conversion between the RGB and XYZ colorimetric systems can not be performed accurately. Thus, it is necessary to always keep the chromaticity (C) for each of the three primary colors (RGB) of a display accurately constant in order to make the conventional method effective. In reality, however, this is impossible.

Therefore it is an object of the present invention to provide a color display system and an image transforming device for performing a correct conversion between the RGB and XYZ calorimetric systems.

In order to achieve the above-mentioned object, the present invention provides a color display system comprising:

an image transforming device transforming an image signal ($X_C$, $Y_C$, $Z_C$) of a XYZ colorimetric system to an image signal of a RGB calorimetric system and outputting the image signal of the RGB calorimetric system; and a display receiving the image signal of the RGB colorimetric system which has been output from the image transforming device, wherein the image transforming device comprises:

a converting part converting the image signal of the XYZ calorimetric system which takes a gradation value between 0 and ($2^n-1$) into RGB linear values using XYZ values corresponding to ($2^n-1$) which is the maximum gradation value of each of RGB of the display, where n is a number of bits of data being used;

a calculation part for calculating an image signal of the RGB colorimetric system $R_d$, $G_d$ and $B_d$ at gradation values d corresponding to the RGB linear values using measurement data between gradation values and XYZ values of each of RGB of the display, obtaining XYZ values ($X_{rd}$, $Y_{rd}$, $Z_{rd}$), ($X_{gd}$, $Y_{gd}$, $Z_{gd}$) and ($X_{bd}$, $Y_{bd}$, $Z_{bd}$) at the gradation values d using the measurement data, and finding a, b and c from $X_C = aX_{rd} + bX_{gd} + cX_{bd}$, $Y_C = aY_{rd} + bY_{gd} + cY_{bd}$, and $Z_C = aZ_{rd} + bZ_{gd} + cZ_{bd}$;

a determination part for determining whether or not the a, b and c found in the calculation part are all within a predefined tolerance range which includes 1 and, when within the range, outputting the $R_d$, $G_d$ and $B_d$ as true values of the image signal of the RGB calorimetric system corresponding to the image signal of the XYZ colorimetric system; and a feedback part for feeding back the calculation results a, b and c to the calculation part to perform the calculation again when determined to be out of the range by the determination part.

The present invention provides an image transforming device transforming an image signal ($X_C$, $Y_C$, $Z_C$) of a XYZ calorimetric system to an image signal of a RGB calorimetric system and outputting the image signal of the RGB calorimetric system to a display comprising:

a converting part converting the image signal of the XYZ calorimetric system which takes a gradation value between 0 and ($2^n-1$) into RGB linear values using XYZ values corresponding to ($2^n-1$) which is the maximum gradation value of each of RGB of the display, where n is a number of bits of data being used;

a calculation part for calculating an image signal of the RGB colorimetric system $R_d$, $G_d$ and $B_d$ at gradation values d corresponding to the RGB linear values using measurement data between gradation values and XYZ values of each of RGB of the display, obtaining XYZ values ($X_{rd}$, $Y_{rd}$, $Z_{rd}$), ($X_{gd}$, $Y_{gd}$, $Z_{gd}$) and ($X_{bd}$, $Y_{bd}$, $Z_{bd}$) at the gradation values d using the measurement data, and finding a, b and c from $X_C = aX_{rd} + bX_{gd} + cX_{bd}$, $Y_C = aY_{rd} + bY_{gd} + cY_{bd}$, and $Z_C = aZ_{rd} + bZ_{gd} + cZ_{bd}$;

a determination part for determining whether or not the a, b and c found in the calculation part are all within a predefined tolerance range which includes 1 and, when within the range, outputting the $R_d$, $G_d$ and $B_d$ as true values of the image signal of the RGB calorimetric system corresponding to the image signal of the XYZ colorimetric system; and a feedback part for feeding back the calculation results a, b and c to the calculation part to perform the calculation again when determined to be out of the range by the determination part.

DESCRIPTION OF THE PREFERRED EMBODIMENTS

Figure 1A:
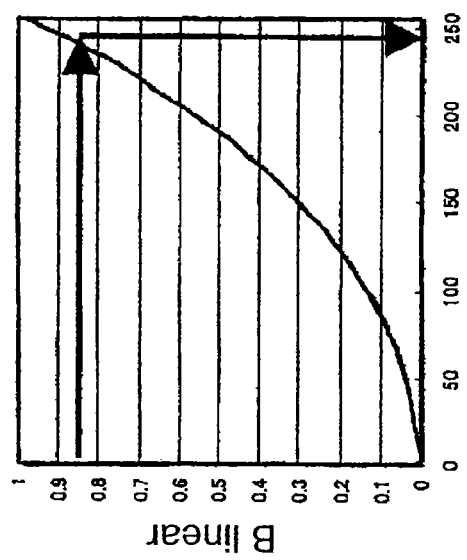
FIGS. 1A to 1C are graphs showing exemplary measurements showing, for tristimulus values of R, G and B, respectively, the relationship between gradation values and normalized Y stimulus values in an XYZ calorimetric system (denoted as Rlinear, Glinear and Blinear).
Figure 1B:
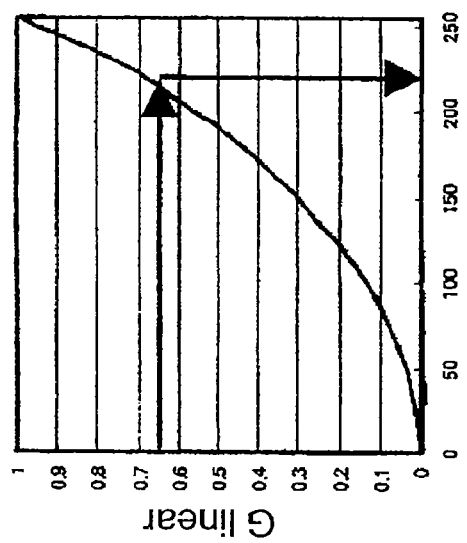
Figure 1C:
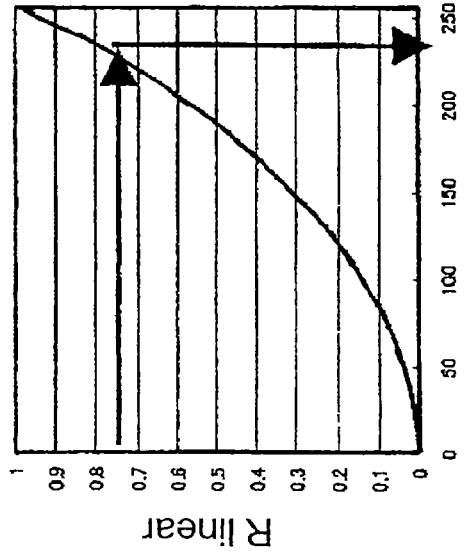
Figure 2:
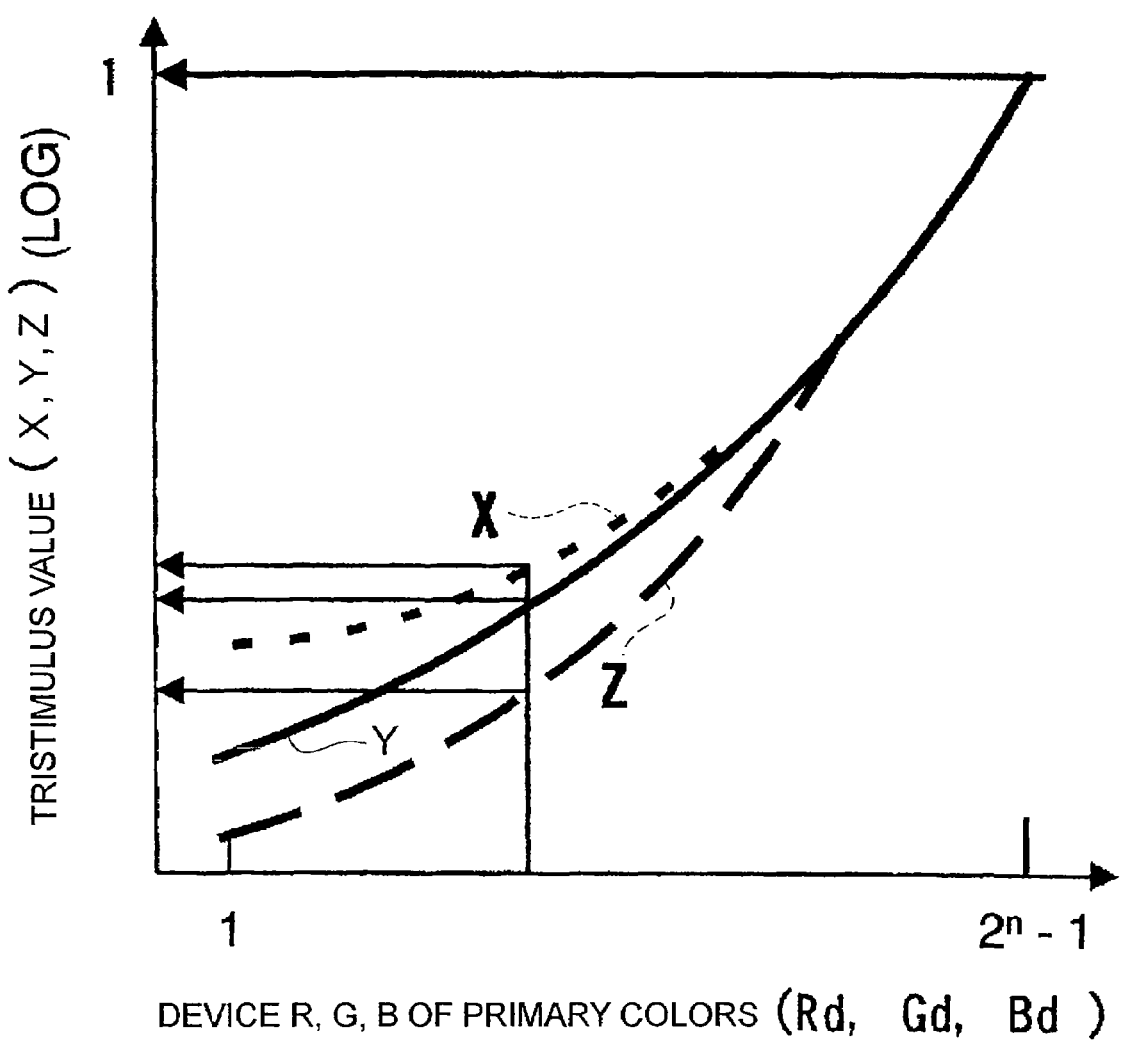
FIG. 2 is a graph showing the relationship between RGB and XYZ on both logarithmic axes, which is normalized by setting the maximum value of the stimulus values X, Y and Z to be 1.

In the following, an embodiment of the present invention will be described in detail referring to the drawings. FIGS. 1A to 1C are graphs of normalized exemplary measurements showing, for the tristimulus values of R, G and B, respectively, the relationship between the input value of the RGB signal into the display and the stimulus value in the XYZ colorimetric system. FIG. 1A is for R (red), FIG. 1B is for G (green), and FIG. 1C is for B (blue). On the horizontal axis, an n-bit digital excitation voltage (or excitation current) varies stepwise from 0 to $(2^n-1)$ one at a time. FIG. 2 is an example of an illustrative drawing showing the normalized relationship between RGB and XYZ, with the minimum and the maximum gradation values of the input excitation voltage set to 0 and $(2^n-1)$, respectively and the maximum of the stimulus values X, Y and Z set to 1. Although each of the stimulus values Xi, Yi and Zi, (i=R or G or B) varies on the vertical axis in relationship to the digital excitation value on the horizontal axis, it does not necessarily correspond linearly.

The following Table 1 is an example showing the relationship among the values of the input excitation voltage(gradation value), X, Y and Z stimulus values, and the luminance(Y stimulus value).

TABLE 1

| gradation | luminance | X | Y | Z |
|---|---|---|---|---|
| 000 | 0.000000 | 0.000000 | 0.000000 | 0.000000 |
| 001 | 0.014722 | 0.008921 | 0.014722 | 0.000000 |
| . | . | . | . | . |
| . | . | . | . | . |
| . | . | . | . | . |
| 100 | 12.2863 | 5.84270 | 12.2863 | 2.02381 |
| . | . | . | . | . |
| . | . | . | . | . |
| . | . | . | . | . |
| 254 | 91.55087 | 43.50986 | 91.55087 | 14.8336 |
| 255 | 92.5194 | 43.9850 | 92.5194 | 14.9770 |

Here, it is assumed that the relationship of the stimulus value to excitation values such as excitation voltage or excitation current is linear. Then, a color (C) can be generally expressed by the following equation (1), using the tristimulus values of the three primary colors R (red), G (green) and B (blue) when the color is displayed.

$$\left.\begin{array}{l} X_C = X_R + X_G + X_B \\ Y_C = Y_R + Y_G + Y_B \\ Z_C = Z_R + Z_G + Z_B \end{array}\right\} \quad (1)$$

Here, $X_R$, $X_G$ and $X_B$ are respectively the R, G and B components of the stimulus value $X_C$. $Y_R$, $Y_G$ and $Y_B$ are respectively the R, G and B components of the stimulus value $Y_C$. $Z_R$, $Z_G$ and $Z_B$ are respectively the R, G and B components of the stimulus value $Z_C$.

In many actual displays, chromaticity of primary colors varies depending on the gradation of the excitation value such as excitation voltage or excitation current, with the gradation of the excitation value varying from zero to $(2^n-1)$ digitally, according to the following relation:

$$\sum_{i=1}^{n} a_i 2^{i-1} - 1 \quad (\text{where } a_i = 0 \text{ or } 1: i = 1, 2 \ldots n)$$

If $a_1=a_2=a_3 \ldots a_{n-1}=1$, then $(\Sigma a_i 2^{i-1}-1)=2^n-1$. Despite such variation, it is possible to set the gradation value(operating point) so that the chromaticity (C) of the primary colors does not remarkably deviate from the linear relation. This is because the coefficient $a_i$ in the above expression $(\Sigma a_i 2^{i-1}-1)$ has an upper limit and a lower limit since the relationship between the excitation voltage (or current) and luminance is continuous, which allows the variation of $a_i$ to be sufficiently small if the setting system of the operating point is selected appropriately. Assuming such a condition, the following equation (2) holds for each of R (red), G (green) and B (blue), using the tristimulus values (XYZ) when the excitation value is $(2^n-1)$.

In equations (2) to (4) below, the term (2n–1) is used to mean $(2^n-1)$.

$$\left.\begin{array}{l} X_C = X_{R(2n-1)}R + X_{G(2n-1)}G + X_{B(2n-1)}B \\ Y_C = Y_{R(2n-1)}R + Y_{G(2n-1)}G + Y_{B(2n-1)}B \\ Z_C = Z_{R(2n-1)}R + Z_{G(2n-1)}G + Z_{B(2n-1)}B \end{array}\right\} \quad (2)$$

Here, R, G and B expresses the ratio of the luminance of the primary colors when color C is displayed, each of which taking an analog value between 0 and 1. The R, G and B will be referred to as linear values hereinafter.

A matrix form of equation (2) is given as equation (3) below.

$$\begin{bmatrix} X_C \\ Y_C \\ Z_C \end{bmatrix} = \begin{bmatrix} X_{R(2n-1)} & X_{G(2n-1)} & X_{B(2n-1)} \\ Y_{R(2n-1)} & Y_{G(2n-1)} & Y_{B(2n-1)} \\ Z_{R(2n-1)} & Z_{G(2n-1)} & Z_{B(2n-1)} \end{bmatrix} \begin{bmatrix} R \\ G \\ B \end{bmatrix} \quad (3)$$

Alternatively, the following equation (4) is determined using an inverse matrix.

$$\begin{bmatrix} R \\ G \\ B \end{bmatrix} = \begin{bmatrix} X_{R(2n-1)} & X_{G(2n-1)} & X_{B(2n-1)} \\ Y_{R(2n-1)} & Y_{G(2n-1)} & Y_{B(2n-1)} \\ Z_{R(2n-1)} & Z_{G(2n-1)} & Z_{B(2n-1)} \end{bmatrix}^{-1} \begin{bmatrix} X_C \\ Y_C \\ Z_C \end{bmatrix} \quad (4)$$

With a general display, since the chromaticity of the half tone gradation reproduction characteristic for each of the primary colors red, green and blue varies, the ratio of tristimulus values between different gradations (i and j) is Xi:Yi:Zi≠Xj:Yj:Zj. The accurate gradation value of the excitation value for color C cannot be determined by the above-mentioned simple matrix calculation.

Using the linear R, G and B values determined for color C according to the description for equations (1) and (2), and also using the half tone reproduction characteristic (FIGS. 1A to 1C) initially measured, gradation of the excitation values for R (red), G (green) and B (blue) are determined, respectively. Since the values are intrinsic to the display, they are referred to as the device RGB and denoted as Rd, Gd and Bd in expression (5).

$$\left.\begin{array}{l} Rd \leftarrow R_{linear} \\ Gd \leftarrow G_{linear} \\ Bd \leftarrow B_{linear} \end{array}\right\} \quad (5)$$

Three sets of tristimulus values, (Xrd, Yrd, Zrd), (Xgd, Ygd, Zgd) and (Xbd, Ybd, Zbd), for the device RGB are determined from the measurement result.

If the display is ideally linear and the ratio of values of the tristimulus values does not vary even if the gradation value of the excitation differs, the tristimulus value of the color determined by adding these three tristimulus values should have a ratio which coincides with that of the tristimulus values of color C presented in equation (1). However, since the chromaticity actually varies for different gradation values of excitation, the color C determined by the sum of the tristimulus values of respective gradation values which are thus determined does not coincide with the actual color C, and the tristimulus value in this case does not coincide with what has been determined by calculation.

Here, the tristimulus values of R (red), G (green) and B (blue) may be multiplied by a, b and c, respectively, to approximately coincide with the tristimulus values of any actually measured color C, where a=1.10, b=0.90 and c=0.95, for example. That is, equation (6) is derived.

$$\left.\begin{array}{l} X_c \approx aXrd + bXgd + cXbd \\ Y_c \approx aYrd + bYgd + cYbd \\ Z_c \approx aZrd + bZgd + cZbd \end{array}\right\} \quad (6)$$

Equation (6) can be expressed in matrix form as in equations (7) and (8) below.

$$\begin{bmatrix} X_C \\ Y_C \\ Z_C \end{bmatrix} = \begin{bmatrix} Xrd & Xgd & Xbd \\ Yrd & Ygd & Ybd \\ Zrd & Zgd & Zbd \end{bmatrix} \begin{bmatrix} a \\ b \\ c \end{bmatrix} \quad (7)$$

$$\begin{bmatrix} a \\ b \\ c \end{bmatrix} = \begin{bmatrix} Xrd & Xgd & Xbd \\ Yrd & Ygd & Ybd \\ Zrd & Zgd & Zbd \end{bmatrix}^{-1} \begin{bmatrix} X_C \\ Y_C \\ Z_C \end{bmatrix} \quad (8)$$

Equation (7) provides a relational expression for determining $X_C$, $Y_C$ and $Z_C$ using the tristimulus values of the display, which are closer to the tristimulus values for the three primary colors when displaying color C. Since the coefficients a, b and c express the luminance ratio of the primary colors R, G and B at that time, they can be regarded as the corrected linear (Ra, Gb, Bc). As with the case when a linear function holds, gradation values that the display may take for respective colors are determined from the half tone reproduction characteristic, according to the relationship of the following equation (9).

$$\left.\begin{array}{l} Rd^\cdot \Leftrightarrow R_{a-linear} \\ Gd^\cdot \Leftrightarrow G_{b-linear} \\ Bd^\cdot \Leftrightarrow Z_{c-linear} \end{array}\right\} \quad (9)$$

Tristimulus values thus determined for each of the three primary colors when displaying color C are (Xrd', Yrd', Zrd'), (Xgd', Ygd', Zgd') and (Xbd', Ybd', Zbd').

The sum of the tristimulus values thus determined are closer to the tristimulus values of the actual color C than the sum of the tristimulus values determined by assuming a linear relationship. If, however, the difference with the tristimulus values of the actually measured color C is still large, the above-mentioned operation will be repeatedly performed until the values of the both come closer. How close the values of the both have come can be determined by examining the values of the coefficients a, b and c. The ideal value of the convergence condition is such that a, b and c are all 1. Therefore, the chromaticity value of a desired precision can be determined by repeatedly performing the operation until a, b and c respectively result in predefined values which are close to 1.

Figures 3A, 3B, 3C:
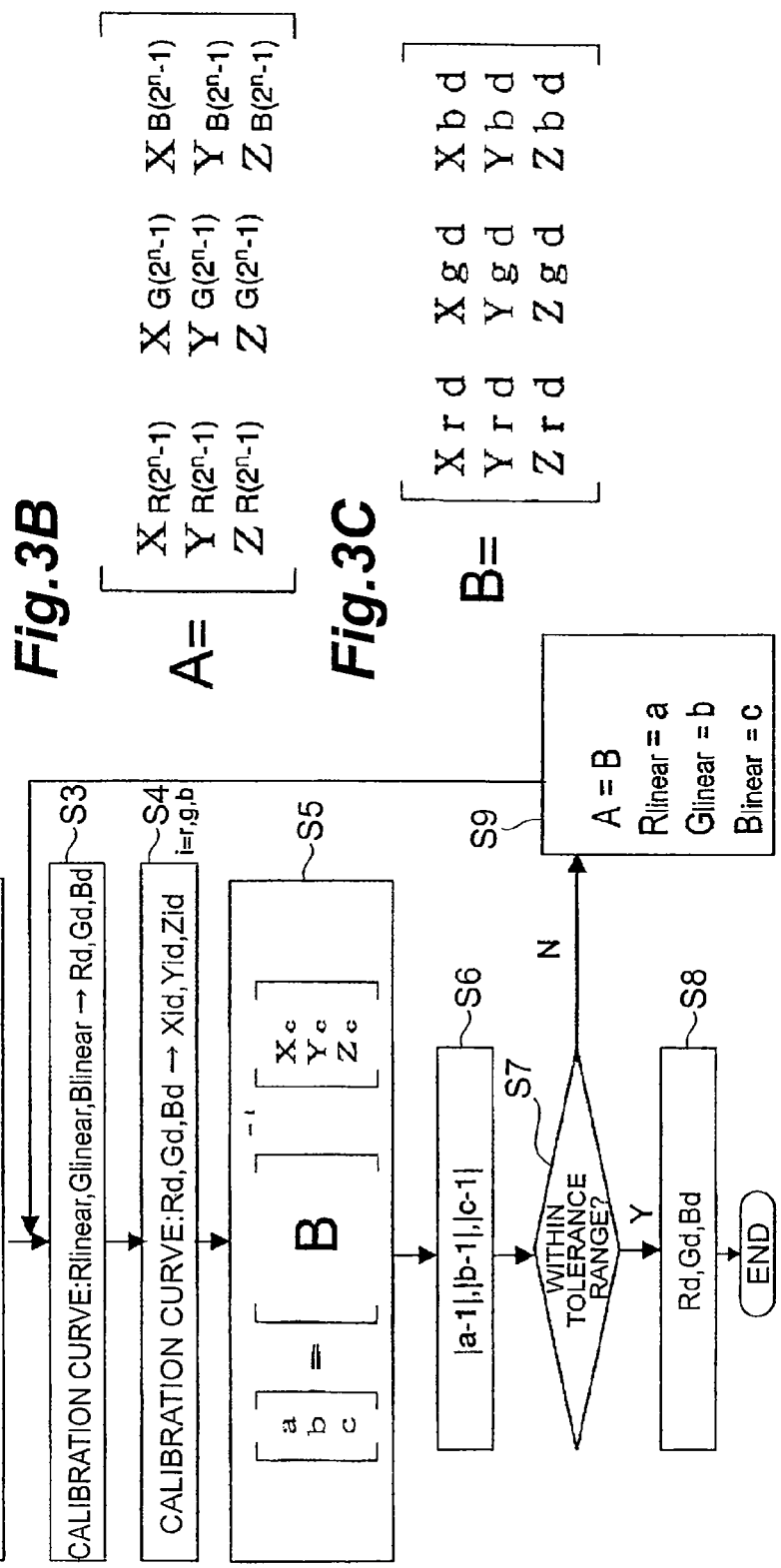
FIG. 3A is a flow chart of the system which performs a high-fidelity color reproduction of the display color.
FIGS. 3B and 3C are drawings showing matrixes.

FIG. 3A is a diagram showing a flow chart of the system which performs a high-fidelity color reproduction of the display color according to the above-mentioned system. First, an image signal ($X_C$, $Y_C$, $Z_C$) of color C is inputted(step S1). ($X_C$, $Y_C$, $Z_C$) is converted into the RGB calorimetric system using the X, Y and Z of each of the three primary colors at the maximum gradation value ($2^n-1$) of the display to determine the value in the RGB calorimetric system at the time(step S2). Then, the values of corresponding (Xrd, Yrd, Zrd), (Xgd, Ygd, Zgd) and (Xbd, Ybd, Zbd) are determined(step S3 and S4). The values of (Xrd, Yrd, Zrd), (Xgd, Ygd, Zgd) and (Xbd, Ybd, Zbd) are used to calculate the values of a, b and c using equation (8) (step 5). The a, b and c are used to calculate |a−1|, |b−1|, and |c−1|(step 6). When |a−1|, |b−1|, and |c−1| are all within the tolerance range, Rd, Gd, and Bd are outputted as true values of the image signal of the RGB colorimetric system corresponding to the image signal of the XYZ calorimetric system(steps 7 and 8). When |a−1|, |b−1|, and |c−1| are out of the range, the calculation results a, b and c are fed back to step3(step 9). In step 9 the a, b and c replace the Rlinear, Glinear and Blinear and matrix B shown in FIG. 3C replaces matrix A shown in FIG. 3B. The above-mentioned calculation(step 3 to 9) is repeated until a, b and c result in predefined values which are close to 1.

Figure 4:
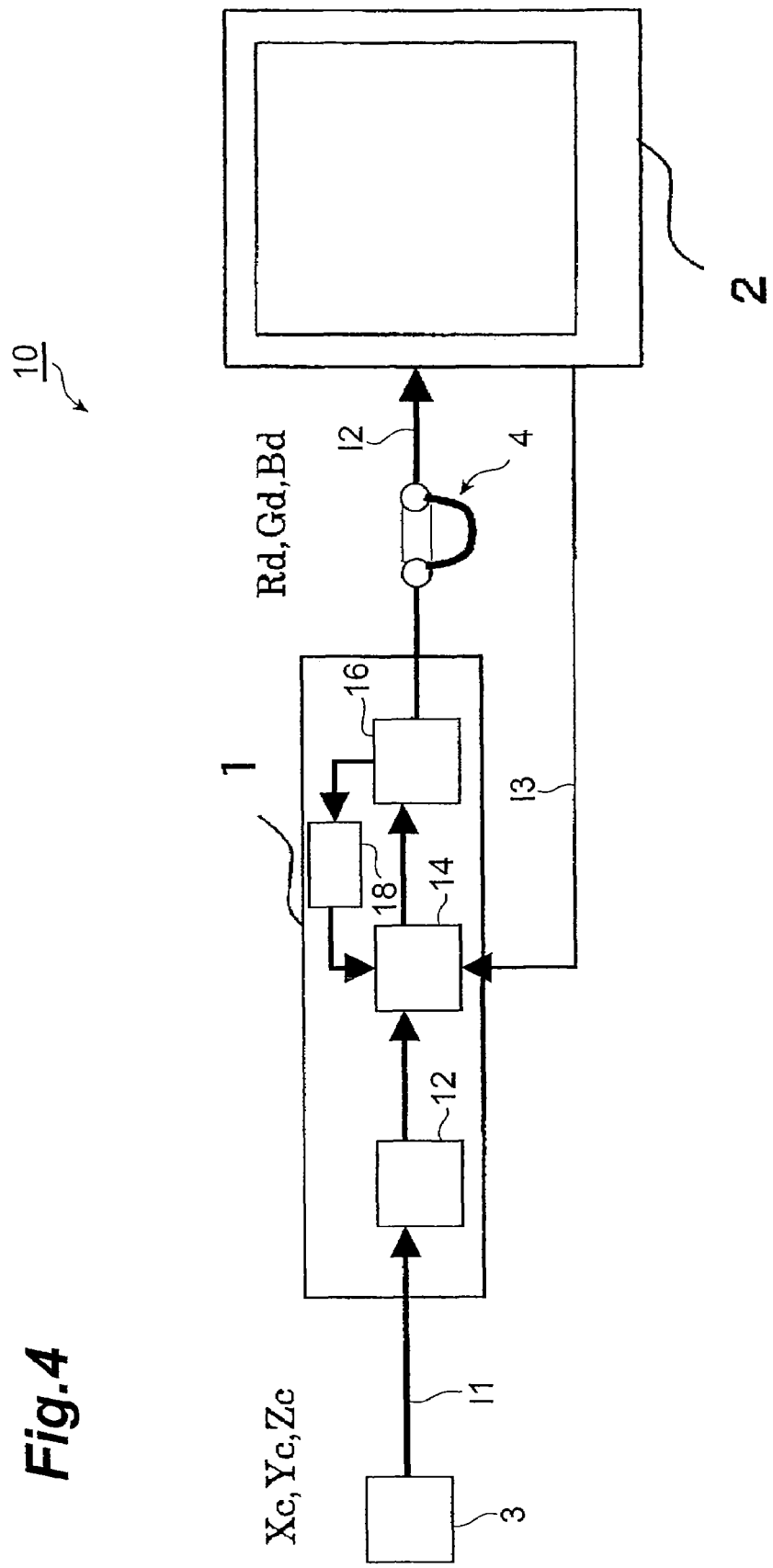
FIG. 4 is a schematic diagram showing a block structure of an embodiment of a color display system.

FIG. 4 is a schematic diagram of an image display showing the block structure of the display, which receives an image signal having display values $X_C$, $Y_C$ and $Z_C$, and after passing the signal through the system comprising the above-mentioned high-fidelity color reproduction function, displays the image signal having display values $R_d$, $G_d$ and $B_d$. A color display system 10 shown in FIG. 4 has an image transforming device 1, a display 2 and a camera 3. The image transforming device 1 and the display 2 are connected by a connection member 4. The image transforming device 1 includes a system comprising a high-fidelity color reproduction function which, when an image signal I1 of the XYZ calorimetric system is input to the image transforming device 1, accurately converts the input gradation values of the XYZ calorimetric system to the RGB colorimetric system, and outputs the image signal I2 of the RGB calorimetric system. The display 2 receives the image signal I2 of the RGB colorimetric system which is output from the image transforming device 1 and displays the image.

The image transforming device 1 has a converting part 12, a calculation part 14, a determination part 16 and a feedback part 18. The converting part 12 converts the image signal I1 of the XYZ calorimetric system into RGB linear values using XYZ values corresponding to $(2^n-1)$ which is the maximum gradation value of each of RGB of the display 2, where n is a number of bits of data being used. The image signal I1 takes a gradation value between 0 and $(2^n-1)$.

The calculation part 14 calculates an image signal of the RGB calorimetric system $R_d$, $G_d$ and $B_d$ at gradation values d corresponding to the RGB linear values using measurement data I3 (for example, see table1) between gradation values and XYZ values of each of RGB of the display 2. The gradation value d of $R_d$, the gradation value d of $G_d$ and the gradation value d of $B_d$ may be different one another. The measurement data I3 include ICC profile and custom file. ICC profile has data of a part of gradation values. Custom file has data of the rest of the gradation values. The calculation part 14 obtains XYZ values $(X_{rd}, Y_{rd}, Z_{rd})$, $(X_{gd}, Y_{gd}, Z_{gd})$ and $(X_{bd}, Y_{bd}, Z_{bd})$ at the gradation values d using the measurement data I3. The calculation part 14 finds a, b and c from $X_C = aX_{rd} + bX_{gd} + cX_{bd}$, $Y_C = aY_{rd} + bY_{gd} + cY_{bd}$, and $Z_C = aZ_{rd} + bZ_{gd} + cZ_{bd}$.

The determination part 16 determines whether or not the a, b and c found in the calculation part 14 are all within a predefined tolerance range which includes 1. When within the range, the determination part 16 outputs the $R_d$, $G_d$ and $B_d$ as true values of the image signal I2 of the RGB colorimetric system corresponding to the image signal I1 of the XYZ calorimetric system.

The feedback part 18 feeds back the calculation results a, b and c to the calculation part 14 to perform the calculation again when determined to be out of the range by the determination part 16.

Since the color display system of the embodiment can be adapted to displays of any form, it is suitable for applying not only to CRT's but also to LCD's and PDP's.

A color display system according to the embodiment can be used with various types of displays. Therefore it can be widely used in a field where high-fidelity color reproduction is required for each of various types of displays.

A color display system for a display device comprising a correction device which includes a system having a high-fidelity color reproduction function for accurately converting, when an image signal of the XYZ calorimetric system is input, the input gradation value of the XYZ colorimetric system into the RGB calorimetric system and outputting an image signal value of the RGB calorimetric system so that a distortion error due to nonlinearity or the like is minimized; and a display device for displaying an image by receiving the image signal of the RGB calorimetric system which is output from the correction device.

The correction device is a color display system for a display device, comprising:

a means for converting a color signal C ($X_C$, $Y_C$, $Z_C$) which may take any gradation value between 0 and $(2^n-1)$ into an RGB linear value using an XYZ value corresponding to $(2^n-1)$ which is the maximum gradation value of each of the RGB of the display device, where n is the number of bits of the data being used;

a calculation means for calculating $R_d$, $G_d$ and $B_d$ corresponding to the RGB linear values at an operating point d on the display device from measurement values, obtaining the value of the corresponding $(X_{rd}, Y_{rd}, Z_{rd})$, $(X_{gd}, Y_{gd}, Z_{gd})$ and $(X_{bd}, Y_{bd}, Z_{bd})$ from a preliminarily created correspondence table, and finding a, b and c from $X_C = aX_{rd} + bX_{gd} + cX_{bd}$ $Y_C = aY_{rd} + bY_{gd} + cY_{bd}$ $Z_C = aZ_{rd} + bZ_{gd} + cZ_{bd}$;

a determination means for determining whether or not the a, b and c found in the calculation means are all within a predefined tolerance range which is close to 1 and, when within the range, outputting the $R_d$, $G_d$ and $B_d$ values as true values of the RGB corresponding to the received color signal; and a feedback means for feeding back, when determined to be out of the range by the determination means, the calculation results a, b and c and causing the calculation means to perform the calculation again.

In the above-mentioned color display system, the display may be of any form such as a CRT(cathode-ray tube), an LCD(liquid crystal display), or a PDP(plasma display panel).

When converting a value of the XYZ colorimetric system into the RGB calorimetric system, in order to eliminate the effect of non-linearity or the like between the excitation voltage (excitation current) being input to the display device and the intensity of the display color, the gradation value of the excitation voltage (excitation current), starting from $(2^n-1)$, is varied by calculation such that the error is reduced, and the optimal gradation value for performing the conversion is determined by finding the minimum error, which is advantageous in that the optimal RGB value can be provided to the display device.

With the above-mentioned advantage, even if the chromaticity (ratio of tristimulus values) of the primary colors varies due to display luminance variation, aging, temperature variation or the like, because the values subject to variation are stored as data the present invention can reproduce the display color accurately depending on the data. Additionally, according to the embodiment, there is an advantage that the display color can be correctly reproduced in a very simple manner because no strict calibration is required for the display device. However, a suitable accuracy is necessary for the measuring device of tristimulus values. Furthermore, there is an advantage that the system of the embodiment can be applied to any type of display devices, including LCD, CRT, PDP or the like, regardless of its constitutive principle, as long as additive color mixture is effective.

What is claimed is:

1. A color display system comprising:
an image transforming device transforming $X_C$, $Y_C$, $Z_C$ of a XYZ image signal of a XYZ calorimetric system to an RGB image signal of a RGB calorimetric system and outputting the RGB image signal of the RGB calorimetric system; and
a display receiving the image signal of the RGB calorimetric system which has been output from the image transforming device;
wherein the image transforming device comprises:
a converting part operable to convert $X_C$, $Y_C$, $Z_C$ of the XYZ image signal by taking a gradation value between 0 and $(2^n-1)$ into RGB linear values using XYZ values corresponding to $(2^n-1)$, wherein the XYZ values corresponding to $(2^n-1)$ represent a maximum gradation value of each of RGB of the display, and further wherein the value, n, represents a number of bits of data being used to convert the $X_C$, $Y_C$, $Z_C$ of the XYZ image signal;
a calculation part operable to calculate $R_d$, $G_d$ and $B_d$ of the RGB image signal at gradation values d corresponding to the RGB linear values, wherein the calculating is performed by:
using measurement data between gradation values and corresponding XYZ values of each of RGB of the display;
obtaining $(X_{rd}, Y_{rd}, Z_{rd})$, $(X_{gd}, Y_{gd}, Z_{gd})$ and $(X_{bd}, Y_{bd}, Z_{bd})$ XYZ values at the gradation values d using the measurement data; and
deriving values for a, b and c from $X_C = aX_{rd} + bX_{gd} + cX_{bd}$, $Y_C = aY_{rd} + bY_{gd} + cY_{bd}$, and $Z_C = aZ_{rd} + bZ_{gd} + cZ_{bd}$;

a determination part operable to determine whether the a, b and c found in the calculation part are all within a predefined tolerance range, wherein the predefined tolerance range includes 1, and, in case the a, b, and c found in the calculation part are within the range, outputting the $R_d$, $G_d$ and $B_d$ as true values of the RGB image signal of the RGB colorimetric system corresponding to the XYZ image signal of the XYZ calorimetric system; and
a feedback part for feeding back the calculation results a, b and c to the calculation part to perform the calculation again when determined to be out of the range by the determination part.

2. The color display system according to claim 1, wherein the display is one of a CRT, an LCD, and a PDP.

3. An image transforming device transforming an $X_C$, $Y_C$, $Z_C$ of a XYZ image signal of a XYZ calorimetric system to an RGB image signal of a RGB colorimetric system and outputting the RGB image signal of the RGB calorimetric system to a display comprising:
a converting part operable to convert the $X_C$, $Y_C$, $Z_C$ of the XYZ image signal by taking a gradation value between 0 and $(2^n-1)$ into RGB linear values using XYZ values corresponding to $(2^n)$, wherein the XYZ values corresponding to $(2^n-1)$ represent a maximum gradation value of each of RGB of the display, and further wherein the value, n, represents a number of bits of data being used to convert the $X_C$, $Y_C$, $Z_C$ of the XYZ image signal;
a calculation part operable to calculate $R_d$, $G_d$ and $B_d$ of the RGB image signal at gradation values d corresponding to the RGB linear values using measurement data between gradation values and XYZ values of each of RGB of the display, obtaining $(X_{rd}, Y_{rd}, Z_{rd})$, $(X_{gd}, Y_{gd}, Z_{gd})$ and $(X_{bd}, Y_{bd}, Z_{bd})$ XYZ values at the gradation values d using the measurement data, and deriving a, b and c from $X_C = aX_{rd} + bX_{gd} + cX_{bd}$, $Y_C = aY_{rd} + bY_{gd} + cY_{bd}$, and $Z_C = aZ_{rd} + bZ_{gd} + cZ_{bd}$;

a determination part operable to determine whether the a, b and c found in the calculation part are all within a predefined tolerance range, wherein the predefined tolerance range includes 1, and, in case the a, b, and c found in the calculation part are within the range, outputting the $R_d$, $G_d$ and $B_d$ as true values of the image signal of the RGB calorimetric system corresponding to the image signal of the XYZ colorimetric system; and
a feedback part for feeding back the calculation results a, b and c to the calculation part to perform the calculation again when determined to be out of the range by the determination part.

* * * * *